United States Patent [19]

Blander et al.

[11] Patent Number: 4,687,564

[45] Date of Patent: Aug. 18, 1987

[54] REFRACTORY LINING FOR ELECTROCHEMICAL CELL

[75] Inventors: Milton Blander, Palos Park; Glenn M. Cook, Naperville, both of Ill.

[73] Assignee: The United States of America as represented by the United States Department of Energy, Washington, D.C.

[21] Appl. No.: 736,575

[22] Filed: May 21, 1985

[51] Int. Cl.[4] .......................... C25C 3/24; C25C 3/34; C25F 1/14
[52] U.S. Cl. ............................. 204/243 R; 204/145 F
[58] Field of Search ............. 204/145 F, 243 R, 141.5

[56] References Cited

U.S. PATENT DOCUMENTS

| | | | |
|---|---|---|---|
| 2,773,023 | 12/1956 | Raynes et al. | 204/140 |
| 2,783,195 | 2/1957 | Raynes et al. | 204/243 R |
| 3,878,073 | 4/1975 | Boorstein et al. | 204/140 |
| 3,953,308 | 4/1976 | Gatellier et al. | 204/243 R |
| 4,166,013 | 8/1979 | Fray et al. | 204/61 |

Primary Examiner—Donald R. Valentine
Attorney, Agent, or Firm—Hugh W. Glenn; Robert J. Fisher; Judson R. Hightower

[57] ABSTRACT

Apparatus for processing a metallic fluid containing iron oxide, container for a molten metal including an electrically conductive refractory disposed for contact with the molten metal which contains iron oxide, an electrolyte in the form of a basic slag on top of the molten metal, an electrode in the container in contcat with the slag electrically separated from the refractory, and means for establishing a voltage across the refractory and the electrode to reduce iron oxide to iron at the surface of the refractory in contact with the iron oxide containing fluid. A process is disclosed for refining an iron product containing not more than about 10% by weight oxygen and not more than about 10% by weight sulfur, comprising providing an electrolyte of a slag containing one or more of calcium oxide, magnesium oxide, silica or alumina, providing a cathode of the iron product in contact with the electrolyte, providing an anode in contact with the electrolyte electrically separated from the cathode, and operating an electrochemical cell formed by the anode, the cathode and the electrolyte to separate oxygen or sulfur present in the iron product therefrom.

10 Claims, 2 Drawing Figures

REFRACTORY LINING FOR ELECTROCHEMICAL CELL

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

This invention relates to a process for the purification of an iron product by the removal of oxygen and sulfur therefrom and to mechanism for protecting refractories used in the steel making process.

As is well known in the steel making art, there are both batch and continuous process for making steel. Both of these processes utilize containers consisting of a support structure which may be steel or other high melting point materials with a protective liner to withstand the high temperatures of the steel making processes. The protective liners are usually selected from refractories. Because of the chemical nature of the slags used in the steel making process, the refractories may be attacked by certain chemical constituents of the slag.

Also, in the steel making art, a major problem is contamination of the molten metal with oxygen and sulfur. Heretofore, the removal of oxygen and sulfur from the iron product was effective to produce a melt containing somewhere in the range of between about 0.01 to 0.02 weight percent oxygen or sulfur. It has now been discovered with the process of the present invention that sulfur and oxygen concentrations in an iron product can be reduced to a few parts per million.

It has also been discovered that the refractories used in the steel making process and particularly those refractories containing magnesium whether as an oxide or a chromite can be protected against the presence of iron oxide which is corrosive to the presently used refractories and causing same to be replaced too frequently at great expenses.

SUMMARY OF THE INVENTION

Accordingly, it is an object of the invention to provide an apparatus and method for processing metallic fluid particularly iron products in which the refractories used in the apparatus are protected from chemical degradation due to the presence of iron oxide and other materials while at the same time reducing the concentrations of contaminants such as oxygen and sulfur to very low levels on the order of several parts per million.

Another object of the present invention is to provide an appartus for processing a metallic fluid containing iron oxide, comprising fluid containing means including an electrically conductive refractory disposed for contact with an iron oxide containing fluid, electrode means including an electrode in the fluid containing means electrically separated from the refractory, and means for establishing a voltage between the refractory and the electrode to reduce iron oxide to iron at the surface of the refractory in contact with the iron oxide containing fluid.

Yet another object of the present invention is to provide a process for refining an iron product containing not more than about 10% by weight oxygen and not more than about 10% by weight sulfur, comprising providing an electrolyte of a slag containing one or more of calcium oxide, magnesium oxide, silica or alumina, providing a cathode of the iron product in contact with the electrolyte, providing an anode in contact with the electrolyte electrically separated from the cathode, and operating an electrochemical cell formed by the anode, the cathode and the electrolyte to separate oxygen or sulfur present in the iron product therefrom.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
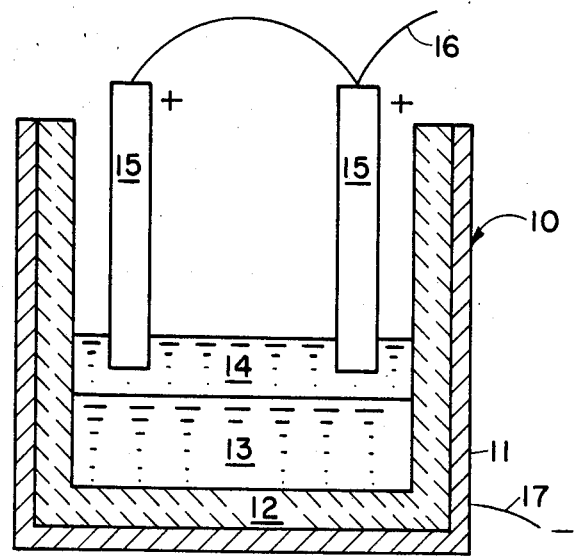
FIG. 1 is a schematic view of a batch apparatus for protecting the conducting refractory useful in steel making by process of the present invention.

Referring now to FIG. 1 there is disclosed a schematic illustration of a container 10 for batch processing of a metallic fluid containing iron oxide such as an iron product typically used to make steel. The container 10 includes a outer metal support 11 and an inner conducting refractory 12. The container 10 holds a molten metal 13 which sinks to the bottom and remains in contact with the conducting refractory 12 and a slag portion 14 which rises to the top of the molten metal 13 and is also in contact with the refractory 12. A pair of electrodes 15 connected by a conductor 16 are positioned in the slag 14 but electrically insulated from the molten metal 13. A conductor 17 connects the metal support 11 of the container 10 with a resistance or load in order to complete the cell. As is understood, the electrodes 15 are anodes and the metal support 11 acts as a cathode. It should be understood that the cathode may be considered to be either the molten metal 13 or the outer metal support member 11 which electrically are connected by the conducting refractory 12.

The metal support 11 may be made of any suitable metal such as stainless steel or if preferred, some other good electrically conducting metal or alloy which has a high melting point. The conducting refractory 12 may be conveniently made of various chromites and oxides and combined with some carbonaceous material such as a conducting graphite fiber in order to make the refractory electrically conducting. Current refractories used in the steel industry include magnesium chromite and magnesium oxide. Electrically conducting graphite fibers are commonly used throughout industry and are well known.

The slag 14 is a basic slag and includes among other things some iron oxide, calcium oxide, magnesium oxide, silica and perhaps some alumina oxide to lower the liquidus temperature of the slag. Other slags are entirely acceptable and may be used in the invention. The molten metal 13 which is an iron product has at this stage of the purification and conversion thereof to steel, preferably not more than about 10 weight percent oxygen and not more than about 10 weight percent sulfur. In this sense, the inventive process is limited to the final purification of the iron product and is not specifically designed for gross separation of impurities. The electrodes or anodes 15 may be made art recognized carbonaceous conducting material which have found wide use as replaceable electrodes in the aluminum industry and particularly cells using the Hall-Heroult process which utilizes replaceable carbon anodes. The invention contemplates use of any suitable anode material.

The voltage across the anode conductor 16 and the cathode conductor 17 may be as small as one volt and the current flow may also be small in the order of 10-100 amps, depending on turbulence and other factors. It is well known that iron melts may be agitated by large currents and the invention is not limited to the use of either small voltages or small currents but may advantageously use either both or depending upon the length of time the cell is operated, it being understood that the cell contemplates the combination of the electrodes 11 and 15 and the electrolyte or slag 14, the impurities such as oxygen and sulfur contained in the metal 13 are forced out of solution in the metal 13 into the slag 14 and then to the anode at which chemical reactions take place which deplete the oxygen and the sulfur ions in the slag.

Another feature of the invention is protection of the conducting refractory 12 by the use of the process hereinbefore described. By maintaining a small voltage across the anode conductor 16 and the cathode conductor 17, the refractory material 12 is protected against attack by any iron oxide present in the slag. The voltage across the cell (the cathode 11-13, the anode 15 and the electrolyte slag 14) provides a reducing environment at the surface of the conducting refractory 12 in contact with the slag 14, thereby to reduce the chemical potential of the iron oxide at the interface so that the chemical reaction of iron oxide with the refractory 12 is substantially slowed to prolong useful life of the refractory.

The process herein described may be operated for a time sufficient, even at low voltages on the orders of 1 to 5 volts and at low current in the order of 10 to 100 amps, to reduce the concentration of oxygen and sulfur dissolved in the molten metal 13 to a concentration of less than about 5 parts per million. Heretofore, the concentrations of oxygen and sulfur could be reduced by conventional means in the range of from about 0.01 weight percent to about 0.02 weight percent, which is far above the concentrations obtainable with the process of the present invention.

Although a variety of materials are available for use in the subject apparatus and process, only a single embodiment has herein been described, it being understood that substitutions of materials are well within the skill of the art. As before stated, the process of the present invention may either be batch or continuous. If the process is continuous, then an apparatus such as that disclosed in FIG. 2 is useful.

Figure 2:
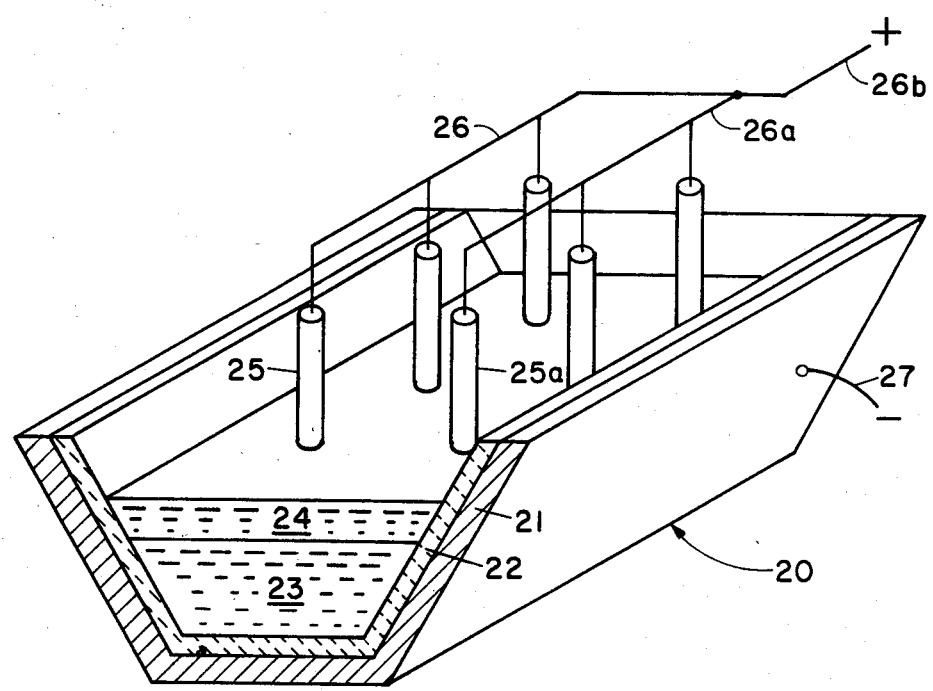
FIG. 2 is a schematic illustration of a trough for a continuous process of steel making in which a conductive refractory is useful in making the steel or other iron product and is protected by the process of the invention in which the process can be operated to produce an iron product having a very low level of oxygen and sulfur.

Referring now to FIG. 2 there is disclosed a trough 20 which is comprised of an outer metal support member 21 and an inner refractory member 22, and contains molten metal 23 in contact with the refractory 22, the molten metal 23 supporting on its surface a slag layer 24. A plurality of longitudinally spaced apart electrodes 25 extend into the slag layer 24 and are connected in parallel by a conductor 26, the electrodes 25 being positioned relatively close to one wall of the trough 20. A second set or plurality of the electrodes 25a are positioned on the other side of the trough 20 and also extend into the slag layer 24 and are connected in parallel by a connector 26a, the conductors 26 and 26a being connected together to form a lead 26b. A conductor 27 is connected to the metal support member 21 which functions as a cathode since the molten metal 23 and the metal support 21 are in electrical connection due to the presence of the conducting refractory 22. In operation, the trough 20 is utilized for a continuous steel making process in which the molten metal 23 and the slag 24 flows through the trough 20. Other than the aforementioned differences, the operation of the apparatus 20 is the same as the apparatus 10 and the process hereinabove described with respect to the apparatus 10 is the same for apparatus 20 with the exception that the apparatus 20 is adopted for a continuous process. The trough 20 has to have a sufficient length when taken in combination with the flow rate of the molten metal 23 therethrough to provide sufficient time for the oxygen and sulfur impurities to be reduced to the desired concentrations.

As hereinbefore stated, the described process uses a basic slag but other slags using calcium silicate, calcium halides, various combinations of iron and magnesium salts such as halides, silicates and the like may be used, all as is well known in the art.

While there has been described what at present is considered to be the preferred embodiments of the present invention, it will be understood that various modification and alterations may be therein without departing from the true spirit and scope of the present invention and it is intended to cover in the claims appended hereto.

The embodiments of the invention in which an exclusive property or privilege is claimed are defined as follows:

1. Apparatus for processing a melt of molten iron in contact with a molten slag containing iron oxide, said apparatus comprising melt containing means including an electrically conductive refractory lining disposed for contact with an iron oxide containing melt, an anode in said melt containing means electrically separated from said refractory lining, and means for establishing a voltage between said refractory lining as cathode and said anode to reduce iron oxide to iron at the surface of said refractory lining in contact with the iron oxide containing melt, said refractory lining including a metal oxide selected from the group consisting of Mg chromites and MgO.

2. The apparatus of claim 1, wherein said melt containing means includes a composite of an outer metal support and an inner refractory lining.

3. The apparatus of claim 2, wherein said refractory lining includes Mg chromites.

4. The apparatus of claim 2, wherein said refractory lining includes MgO and electrically conducting graphite fibers.

5. The apparatus of claim 4, wherein said refractory lining contains means for making said refractory electrically conductive.

6. The apparatus of claim 5, wherein said means includes electrically conducting graphite fibers present in said refractory.

7. The apparatus of claim 1, wherein said anode means includes a carbonaceous material as an anode.

8. The apparatus of claim 7, wherein said anode means includes a plurality of carbonaceous anodes.

9. The apparatus of claim 1 wherein said melt containing means includes a trough for continuous processing of a molten metal.

10. An apparatus for electrochemical protection of a refractory vessel for processing a melt of molten iron and molten slag including iron-oxide, said apparatus comprising;

container means for said melt including a composite wall of outer metal support and an electrically conductive, refractory inner lining, said lining including a metal oxide refractory selected from the group consisting of magnesium chromites and magnesium oxide;

an electrode member positioned within said container means to contact said molten slaq containing iron oxide but electrically separated from said electrically conductive inner lining; and electrical means for applying a direct current connected to said container means and to said electrode member with polarity aligned to maintain said refractory inner lining as cathode and said electrode member as anode at an electrical potential difference sufficient to reduce iron oxide concentration at the inner surface of the refractory lining in contact with the iron oxide containing melt.

* * * * *